(12) United States Patent
Lotspeich et al.

(10) Patent No.: US 11,650,803 B2
(45) Date of Patent: May 16, 2023

(54) DIFFERENCE VALIDATION AND AUDITING (DVA) TOOL

(71) Applicant: RUNSAFE SECURITY, INC., McLean, VA (US)

(72) Inventors: Erik Raymond Lotspeich, Huntsville, AL (US); Shane Paulsen Fry, Madison, AL (US); Doug Britton, Kensington, MD (US)

(73) Assignee: RUNSAFE SECURITY, INC., McClean, VA (US)

( * ) Notice: Subject to any disclaimer, the term of this patent is extended or adjusted under 35 U.S.C. 154(b) by 0 days.

(21) Appl. No.: 17/604,353

(22) PCT Filed: Apr. 20, 2020

(86) PCT No.: PCT/US2020/028973
§ 371 (c)(1),
(2) Date: Oct. 15, 2021

(87) PCT Pub. No.: WO2020/215070
PCT Pub. Date: Oct. 22, 2020

(65) Prior Publication Data
US 2022/0197619 A1    Jun. 23, 2022

Related U.S. Application Data

(60) Provisional application No. 62/835,622, filed on Apr. 18, 2019.

(51) Int. Cl.
*G06F 9/44* (2018.01)
*G06F 8/52* (2018.01)
(Continued)

(52) U.S. Cl.
CPC ............. *G06F 8/52* (2013.01); *G06F 8/34* (2013.01); *G06F 8/433* (2013.01); *G06F 8/51* (2013.01)

(58) Field of Classification Search
None
See application file for complete search history.

(56) References Cited

U.S. PATENT DOCUMENTS 9,448,788 B1 * 9/2016 Barua ................. G06F 8/52
11,048,502 B1 * 6/2021 Hogan ................ G06N 3/0454
(Continued)

OTHER PUBLICATIONS

International Search Report and Written Opinion of International Application No. PCT/US2020/028973; dated Jul. 21, 2020; 14 pages.
(Continued)

*Primary Examiner* — Anna C Deng
(74) *Attorney, Agent, or Firm* — Perkins Coie LLP

(57) ABSTRACT

Systems and methods of cyber hardening software by modifying one or more assembly source files. In some embodiments, the disclosed SME tool transparently and seamlessly integrates into the build process of the assembly source files being modified. For example, upon integration of the disclosed SME tool into the application's development environment, the modifications in the final executable are transparent to the developer and can support other cyber hardening techniques. The SME tool includes a preprocessing tool for identifying attributes (e.g., functions) associated with the assembly source file. The SME tool also includes a transformation tool for making modifications of the assembly source file. In some embodiments, the transformations correspond to applying one or more transformations to the attributes associated with the assembly source file.

15 Claims, 12 Drawing Sheets

(51) Int. Cl.
*G06F 8/34* (2018.01)
*G06F 8/41* (2018.01)
*G06F 8/51* (2018.01)

(56) References Cited

U.S. PATENT DOCUMENTS

| | | | |
|---|---|---|---|
| 2004/0111719 A1* | 6/2004 | Civlin | G06F 8/60 |
| | | | 717/151 |
| 2004/0221270 A1 | 11/2004 | Mitchel et al. | |
| 2005/0183072 A1* | 8/2005 | Horning | G06F 21/14 |
| | | | 717/140 |
| 2011/0265063 A1 | 10/2011 | De Oliveira Costa | |
| 2015/0135313 A1* | 5/2015 | Wesie | G06F 21/51 |
| | | | 726/22 |
| 2017/0177314 A1* | 6/2017 | Powers | G06F 8/41 |
| 2017/0371635 A1* | 12/2017 | Davidson | G06F 8/52 |
| 2019/0220596 A1* | 7/2019 | Lie | G06K 9/6267 |

OTHER PUBLICATIONS

Extended European Search Report for European Application No. 20791201.5; Date of Mailing: Dec. 13, 2022; 12 pages.

* cited by examiner

```
  call exampleprint
+ pushf
+ push $rs_compare_return_2_5
+ push $exampleprint
+ jmp token_compare
+rs_compare_return_2_5:
+ mov $exampleprint, %r11
+ add $4, %r11
+ popf
+ call *%r11
```

FIG. 2

```
include <stdio.h> int main(void) {
printf("Hello, world.\n");
return 0;
}
```

*FIG. 9A Example of Source code in C*

```
$ gcc -m32 -S hello_world.c
$ cat hello_world.s
  .file  "hello_world.c"
  .section  .rodata
.LC0:
  .string "Hello, world."
  .text
  .globl  main
  .type   main, @function
main:
.LFB0:
  .cfi_startproc
  pushl   %ebp
  .cfi_def_cfa_offset 8
  .cfi_offset 5, -8
  movl    %esp, %ebp
  .cfi_def_cfa_register 5
  andl    $-16, %esp
  subl    $16, %esp
  movl    $.LC0, (%esp)
  call    puts
  movl    $0, %eax
  leave
  .cfi_restore 5
  .cfi_def_cfa 4, 4
  ret
  .cfi_endproc
.LFE0:
  .size  main, .-main
  .ident "GCC: (Ubuntu 4.8.4-2ubuntu1~14.04.4) 4.8.4"
  .section  .note.GNU-stack,"",@progbits
```

*FIG. 9B Example compiler output in assembly language*

```
0804841d <main>:
804841d: 55                          push    %ebp
804841e: 89 e5                       mov     %esp,%ebp
8048420: 83 e4 f0                    and     $0xfffffff0,%esp
8048423: 83 ec 10                    sub     $0x10,%esp
8048426: c7 04 24 d0 84 04 08        movl    $0x80484d0,(%esp)
804842d: e8 be fe ff ff              call    80482f0 <puts@plt>
8048432: b8 00 00 00 00              mov     $0x0,%eax
8048437: c9                          leave
8048438: c3                          ret
8048439: 66 90                       xchg    %ax,%ax
804843b: 66 90                       xchg    %ax,%ax
804843d: 66 90                       xchg    %ax,%ax
804843f: 90                          nop
```

*FIG. 9C Example output showing disassembly of assembly language code*

DIFFERENCE VALIDATION AND AUDITING (DVA) TOOL

CROSS-REFERENCE TO RELATED APPLICATION(S)

This application is a U.S. National Stage Application of PCT/US2020/028973, filed Apr. 20, 2020, which claims priority to U.S. Provisional Patent Application No. 62/835,622 filed on Apr. 18, 2019, the entireties of which are incorporated herein by reference.

TECHNICAL FIELD

This disclosure is related to code transformations. More particularly, the embodiments disclosed herein are directed at systems, apparatuses, and methods that perform transformation of source code (e.g., assembly code) to facilitate cyber hardening.

BACKGROUND

Network firewalls and Intrusion Detection Systems (IDS) are the first lines of defense for computer networks and systems. Firewalls protect nodes on a network by restricting access to the nodes themselves or network services (e.g. web, e-mail, etc.). IDSes monitor systems for malicious activity and policy violations. While a firewall can restrict access to services, any service left accessible and not restricted (e.g. a web server) is still vulnerable if a security flaw is present. An IDS detects and reports unauthorized access, policy violations, or malicious activity. However, an IDS can detect and report suspicious network activity, at the time the activity is occurring or after the activity has happened. Thus, there is a need for improved systems and methods for preventing attack or exploitation of systems before they are compromised.

BRIEF DESCRIPTION OF THE DRAWINGS

FIG. 2 is an example code snippet showing modifications to application code.

FIG. 9A illustrates an example snippet of source code.

FIG. 9B illustrates an example of compiler output.

FIG. 9C illustrates an example output showing disassembly of assembly language code.

DETAILED DESCRIPTION

This disclosure is directed at systems and methods of a Difference Validation and Auditing (DVA) tool that provides a simplified summary of system-level engineering changes made to a runtime application, e.g., to facilitate cyberhardening. This can be of benefit to developers, systems engineers, and quality assurance engineers to be made aware of what are the various changes, if any, in the application. The nature of modifying source code (e.g. assembly source) has the potential to modify the behavior of applications. This tool can allow a user to visually identify what changes have been made to an application and where, as a result of cyberhardening.

One advantage of the disclosed DVA tool is that it can positively demonstrate the validity of binary reorganization of an application. This validity can assure developers that the modified software is not prone to generate unintended program behavior (typically, by hackers). The disclosed DVA tool (e.g., primarily a software tool) can thus show modifications of an application are "inert" with respect to intended program functions. For example, the DVA tool can check that the modified software generates same outputs for a given set of inputs. In some embodiments, the disclosed DVA tool can characterize the impact of modification/transformation using commonly-understood metrics such as memory consumption, execution time, and file size.

Figure 1:
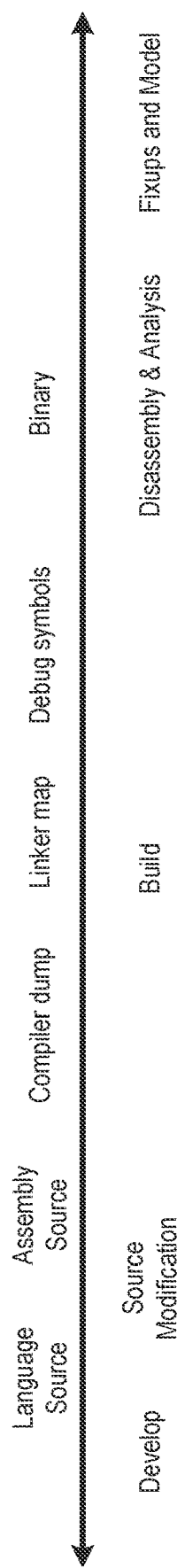
FIG. 1 illustrates an example timeline showing actions or steps taken in connection with cyber hardening.

Referring now to the technology in more detail, FIG. 1 illustrates an example timeline of actions or steps taken in connection with cyber hardening. After development (left end) of the source code, these actions or steps (a/k/a cyber hardening steps) include modification or transformation of a file at a certain stage in the continuum to help in protecting the software against future cyberattacks. The example timeline in FIG. 1 shows a continuum from source code to the final binary and includes possible locations where cyber hardening can take place. Examples of cyber hardening locations can be at the source file (which is written in high-level language), the assembly source file, and/or a program binary.

Full and complete analysis of compiled program binaries is difficult. If binary analysis is incomplete or incorrect, transformation of the binary can result in inaccuracies if the transform grows, relocates, or moves functions.

On the contrary, assembly source files provide a better location for modifications such as insertion of CFI checks. Details of implementation related to CFI checks have been discussed in App. Nos. 62/764,705, filed Aug. 15, 2018, and 62/764,751, filed Aug. 15, 2018, both of which are incorporated by reference herein. CFI checks may be inserted at the assembly level by separating the compilation process into compile and assemble constituents. After compilation, a tool can modify the assembly adding CFI checks and supporting code needed by the CFI implementation. The modified assembly is then assembled and linked.

In some embodiments, the disclosed DVA tool can validate and audit a binary transformation. In some embodiments, the disclosed DVA tool can validate and audit a source modification engine (SME) transformation. However, the DVA tool works differently in the above validation scenarios. When validating a binary transformation, the DVA tool works on a disassembled program binary. However, for validating source transformation, the assembly source is readily available so the DVA tool operates on the original source and modified source directly without requiring disassembly. In some embodiments, the binary transformation is associated with the disassembly and hence the DVA tool can use the disassembled binary generated from the binary transformation.

FIG. 2 is an example code snippet showing modifications to application code. The modifications can be due to application of source transforms or binary transforms. For example, the diff tool in Linux can show the changes (additions and/or deletions) to the application code. In FIG. 2, the lines of code with a minus (shown as '−') correspond to deleted lines and lines with a plus (shown as '+') correspond to additions to the original application code. The example in FIG. 2 shows changes due to application code made by applying a Control Flow Integrity (CFI) transform at a site or location in the code where the function "exampleprint" is called. By inserting a check verifying that a valid function is called at a calling site of a function, the transform can make changes to the application code. One patentable advantage of the disclosed DVA tool is that validation becomes simpler because the inserted assembly (changes shown with a plus in FIG. 2) is the same at each call site of a function, with the exception of the name of the function being verified. For example, if a different function, say named "foobar" is called, the inserted assembly for "foobar" and the inserted assembly for "exampleprint" is the same.

In some embodiments, changes (or, differences) other than those shown in FIG. 2 can be made to application code. These changes, for example, can be insertion of a CFI token (used for verification) into the application code after each function call and at the beginning of functions, insertion of a call CFI check, insertion of a return CFI check, insertion of a token comparison function, insertion of a wrapper function for indirect call checks, insertion of a wrapper function for register call checks, or insertion of code to jump over the return CFI code in functions that do not return normally. Details of implementation related to CFI checks have been discussed in App. Nos. 62/764,705, filed Aug. 15, 2018, and 62/764,751, filed Aug. 15, 2018, both of which are incorporated by reference herein.

Figure 3:
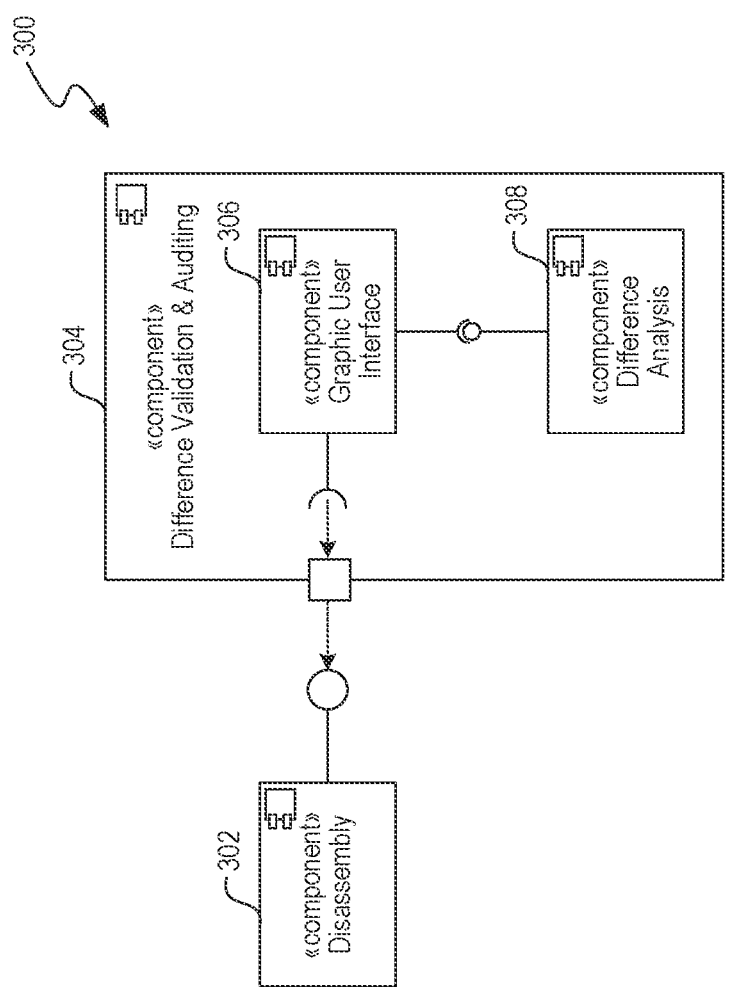
FIG. 3 illustrates a component diagram of an embodiment of the DVA tool associated with an external disassembly.

FIG. 3 is a component diagram 300 of an embodiment of the DVA tool associated with an external disassembly. Specifically, FIG. 3 is a UML component diagram illustrating components of the DVA tool 304 and its interactions with external disassembly component 302. DVA tool 304 includes a graphical user interface (GUI) component 306 and a difference analysis component 308. External disassembly component 302 provides disassembly of binaries so that DVA can present this information to the user. Difference analysis component 308 processes the differences between the original assembly source code and modified assembly source code, which is presented on GUI component 306 to users.

Figure 4:
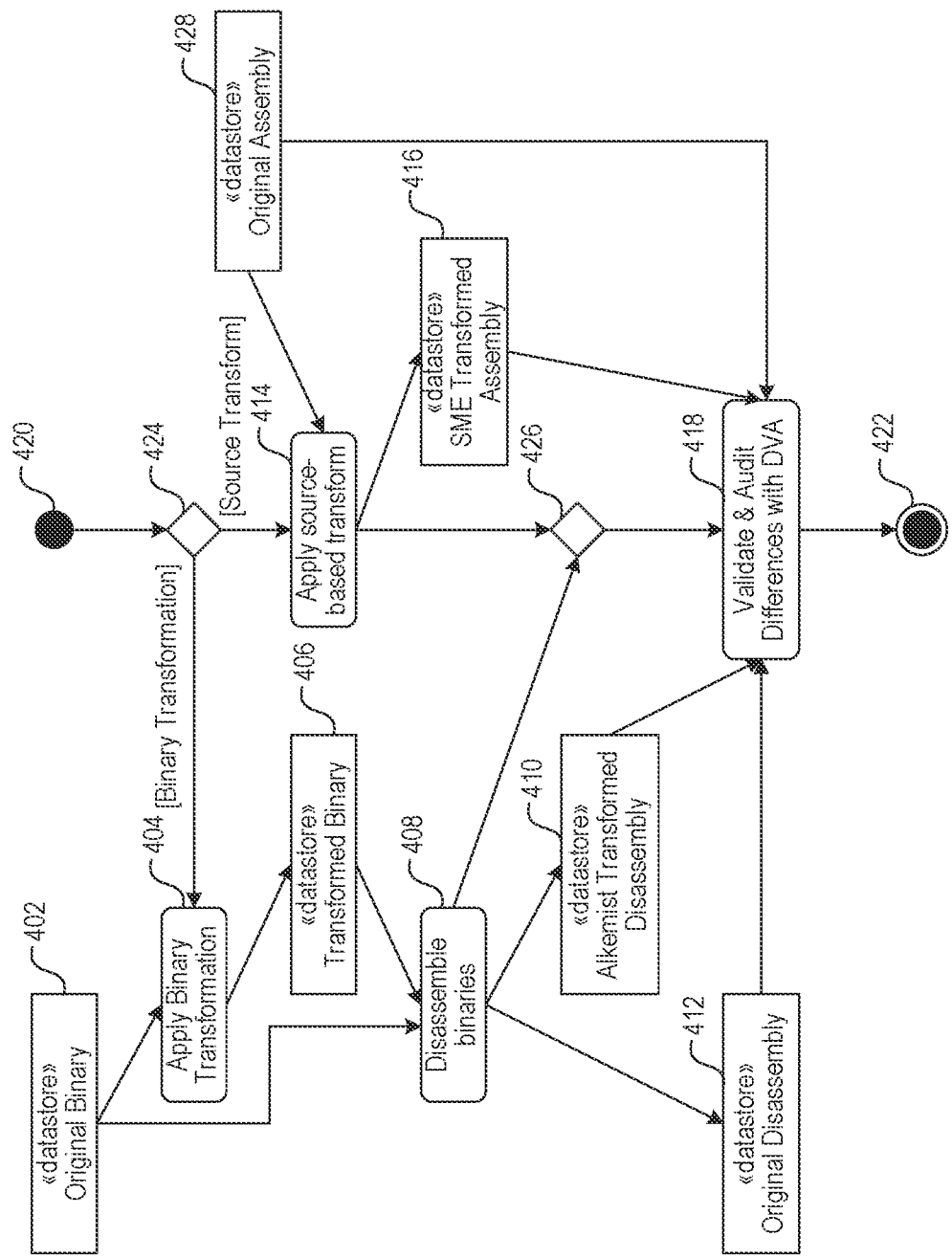
FIG. 4 illustrates a UML activity diagram showing a notional workflow of the disclosed DVA tool used for cyberhardening applications with binary transformation or source transformation methods.

FIG. 4 illustrates a UML activity diagram showing a notional workflow of the disclosed DVA tool for cyberhardening applications with binary transformation or source transformation methods. Element 420 represents the starting point in the workflow. Element 424 represents a decision node that checks whether DVA tool is validating differences due to changes made by a binary transformation or a source transformation. Element 402 represents an original program binary (e.g., stored in datastore) to be cyberhardened. If the DVA tool determines that changes correspond to binary transformation, then the activity involves reading original program binary 402, applying binary transformation 404, and outputting the transformed binary 406 (which can be saved in a datastore). Element 408 represents an activity to disassemble one or more binaries resulting in assembly source corresponding to each binary. The inputs to element 408 are elements 402 and 406. The disassembled binaries are output as 410 and 412, one or both of which can be saved in a datastore. Element 410 represents disassembly of the transformed binary and element 412 represents disassembly of the original binary.

At decision node 424, if the DVA tool determines that changes correspond to a source transformation, a source transformation is applied (e.g., using a source modification engine (SME) tool) to original assembly 428 at 414. Element 416 represents an assembly transformed with SME. Element 426 represents a merge node, e.g., a meeting point where the DVA tool has access to the assembly source generated by either disassembly 408 or through source transformation 414 and can proceed to the next step 418.

Element 418 represents a difference comparison point. Specifically, at 418, the DVA tool compares the differences between (i) the original disassembly 412 and the transformed disassembly 410 (binary transformation case) or (ii) the original assembly 428 and transformed assembly 416 (source transformation case). The output of the comparison is presented to the user. Element 422 represents the end point of the UML activity diagram.

Figure 5A:
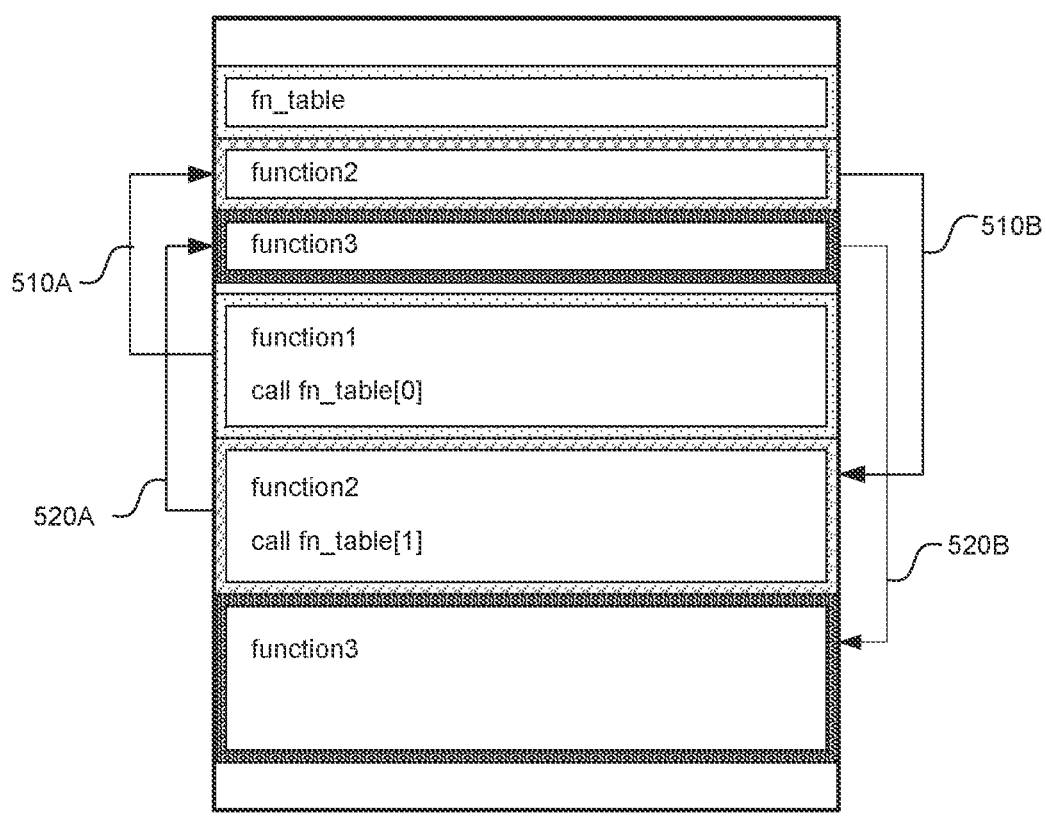
FIGS. 5A and 5B are visual illustration of blocks of application code, prior to modifications.
Figure 5B:
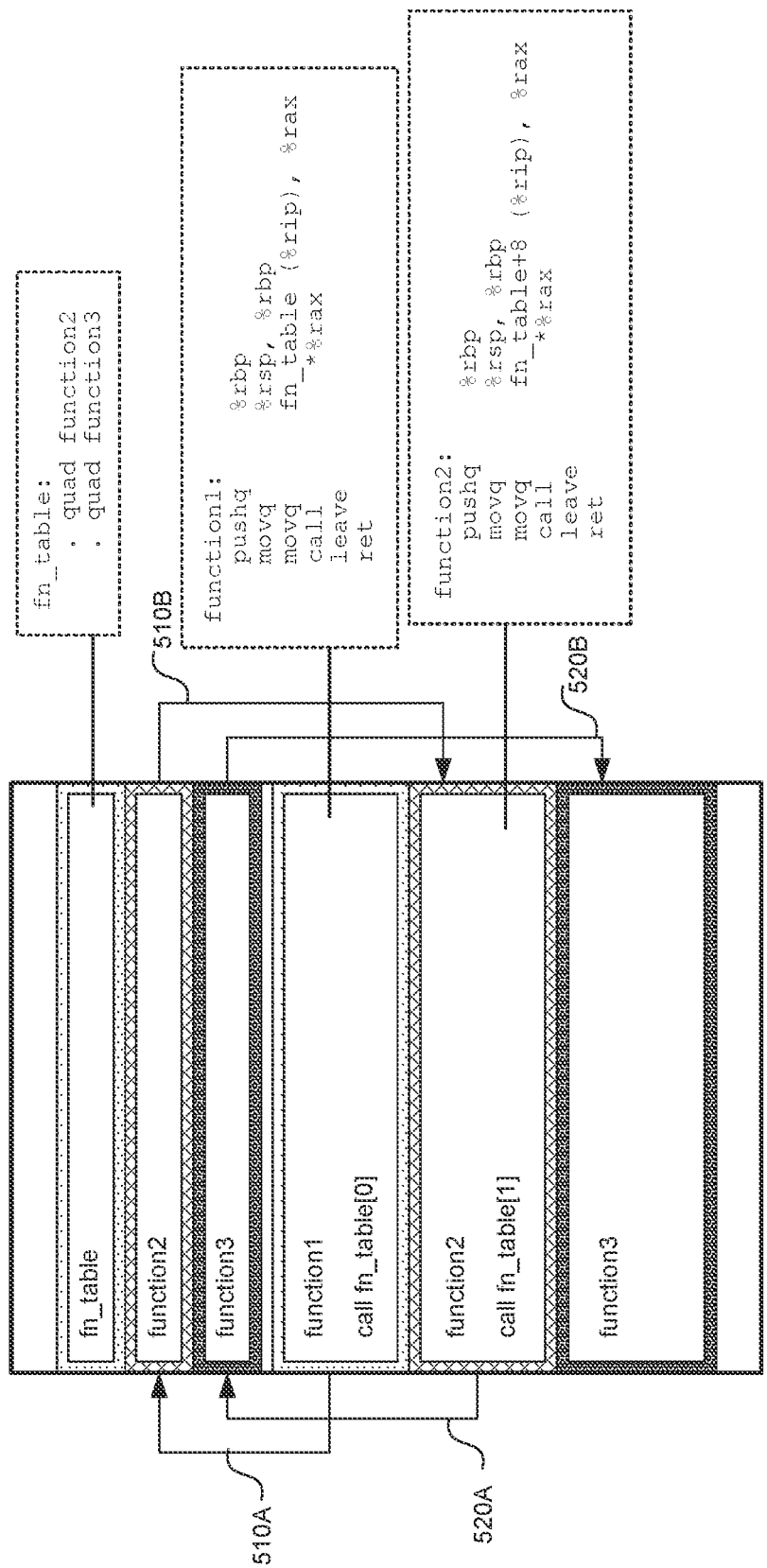

FIGS. 5A and 5B are visual illustration of snippets of assembly source code or application code, prior to modification by applying a binary transformation or a source transformation. The assembly source code (or, machine code) eventually becomes assembly instructions that are executable from the text region of the memory. Fn_table comprises a data section storing an array of function pointers. In this illustration, it is assumed that fn_table stores addresses of function2 and function3. For example, fn_table[0] stores the address of function2 in memory and fn_table[1] stores the address of function3 in memory. It is also assumed that function1 makes an indirect call (shown with arrow 510A) to function2 and function2 makes an indirect call (shown with arrow 520A) to function3. Assembly source code corresponding to the indirect calls are call fn_table[0] and call fn_table[1]. FIG. 5A shows de-referenced calls 510B, 520B (e.g., pointing to function2 and function3) corresponding to the indirect calls 510A, 520A. In some embodiments, the visual illustration of the snippet (including direct/indirect function calls) can be generated by an embodiment of the disclosed DVA tool for display on a GUI. The blocks shown in FIG. 5A are merely for purposes of illustration. In alternate embodiments, other blocks of assembly source can exist.

FIG. 5B is another visual illustration of snippets of assembly source code or application code, prior to modification by applying a binary transformation or a source transformation. Specifically, FIG. 5B is generated by overlaying the assembly source code blocks on FIG. 5A. The assembly source code (shown with dotted blocks) correspond to fn_table, function1, and function2. For example, FIG. 5B can be generated when a user (e.g., a process engineer) clicks on the fn_table, function1, and function2 blocks, in FIG. 5A. The blocks shown in FIGS. 5A and 5B are merely for purposes of illustration. In alternate embodiments, a user can click on any one of the blocks in FIG. 5A or, even other blocks. One patentable benefit of the disclosed DVA tool is in generating graphical visualization of code with the ability to expand the high-level view. Visualization enables straightforward validation by systems engineers and process engineers not familiar with or lack expertise with the assembly.

Figure 6A:
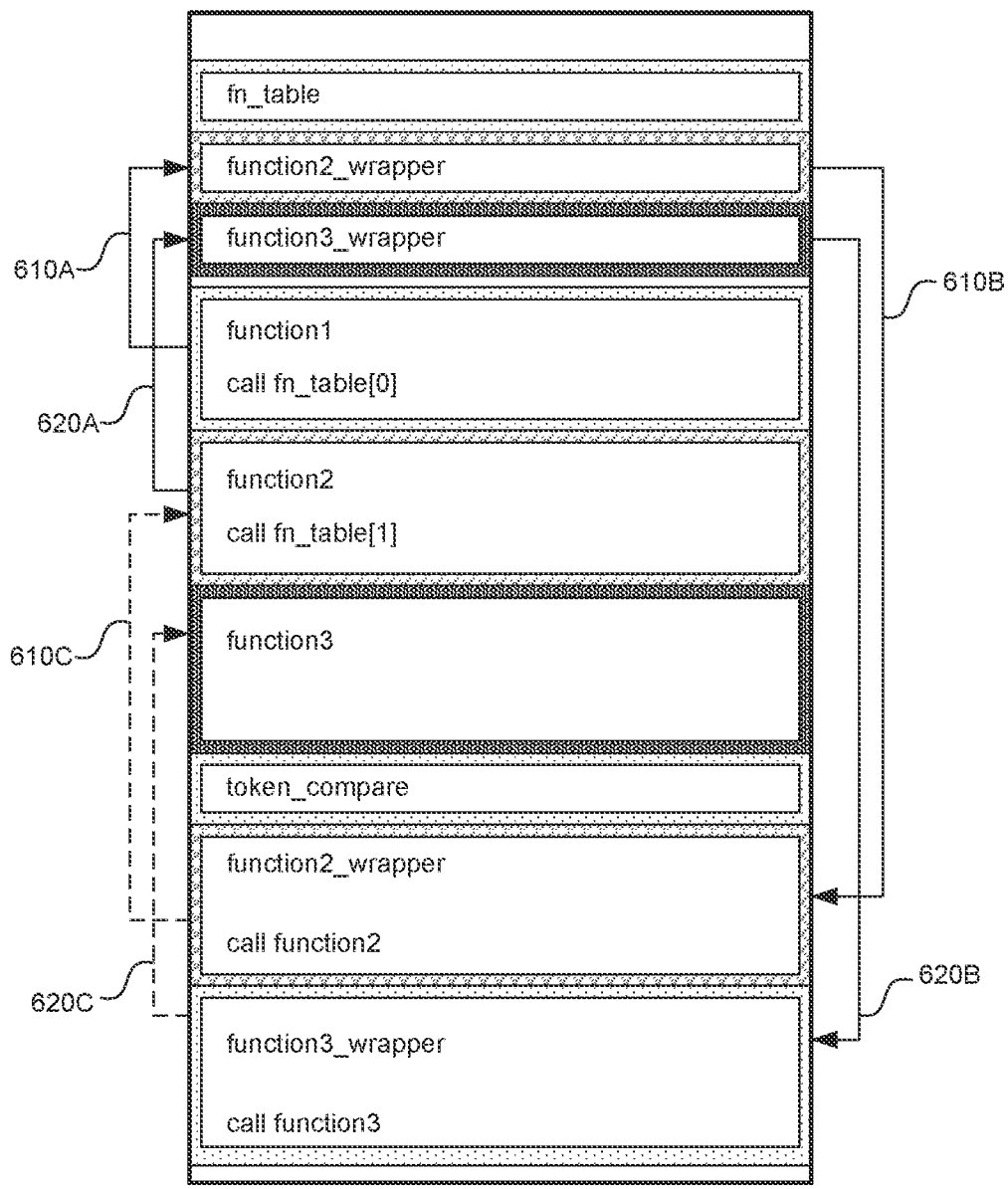
FIGS. 6A and 6B are visual illustrations of modified blocks of application code.
Figure 6B:
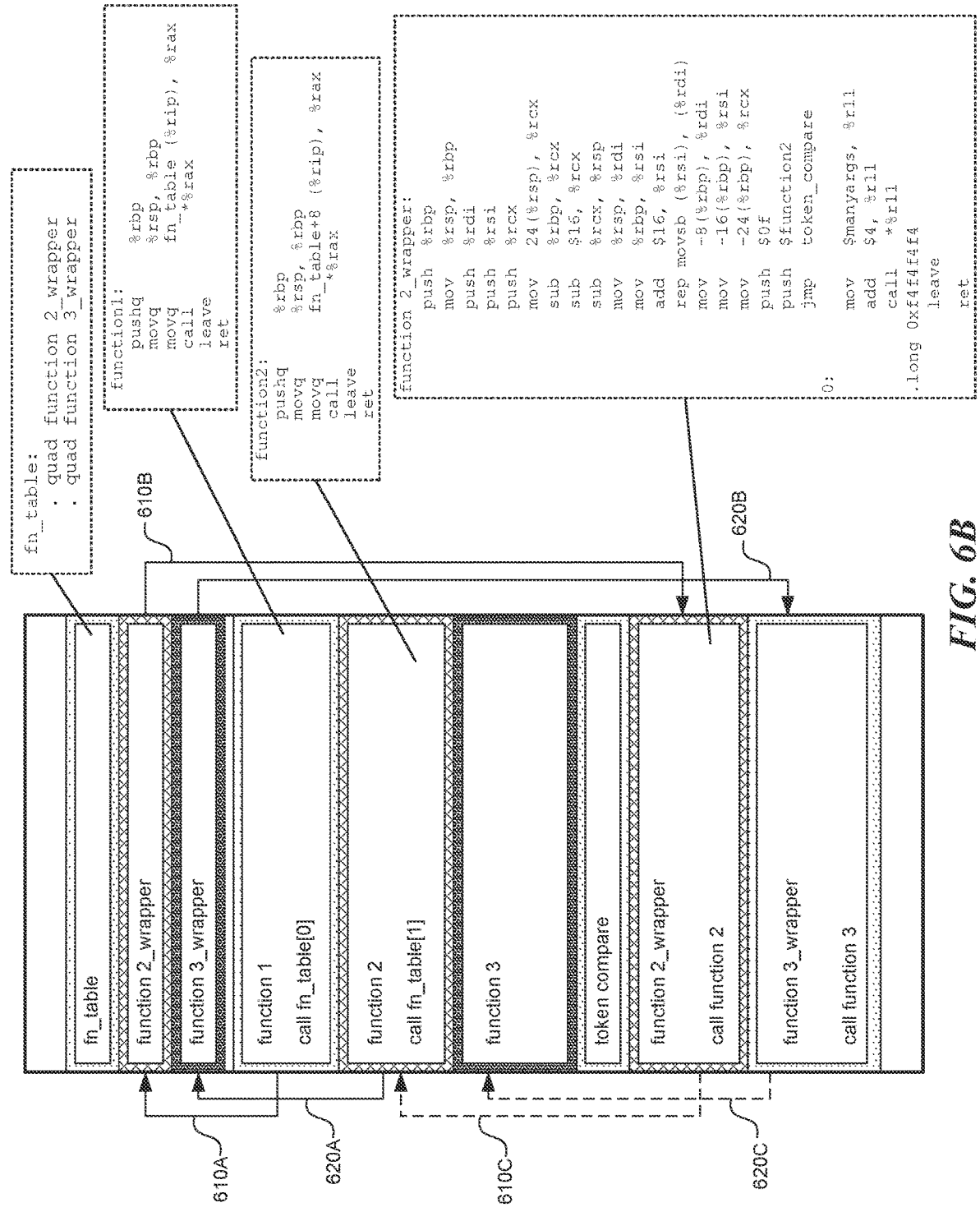

If a transformation is applied to the application code, then the original code gets transformed. For example, new functions can be added that can change the structure of original function calls. FIGS. 6A and 6B illustrate such modifications to blocks of application code, upon being subjected to a source transformation.

FIGS. 6A and 6B are visual illustrations of a modified block of application code. One patentable benefit of the disclosed DVA tool is that it can generate graphical visualization of changes to application code. FIG. 6A shows a visual illustration resulting from application of source transformation to the application code in FIG. 5A. Fn_table comprises a data section storing an array of function pointers. It is assumed that the original fn_table stores addresses of function 2 and function 3. However, after applying a source transformation, the SME tool modifies the values stored in the function pointers to point to wrapper functions corresponding to function2 and function3. For example, fn_table[0] stores the address of function2_wrapper in memory, fn_table[1] stores the address of function3_wrapper in memory. Wrapper function named function2_wrapper performs CFI checks on the call/return of function2. Similarly, wrapper function named function3_wrapper performs CFI checks on the call/return of function3. It is also assumed that function1 makes an indirect call (shown with arrow 610A) to function 2 and function 2 makes an indirect call (shown with arrow 620A) to function 3. Assembly source code corresponding to the indirect calls are call fn_table[0] and call fn_table[1]. As a result of the modification by the source transformation, upon getting de-referenced, indirect calls 610A, 620B are re-routed to function2_wrapper and function3_wrapper respectively, instead of pointing to function2 and function3. Arrows 610B, 620B show the resulting de-references corresponding to indirect calls 610A, 620B. By placing a wrapper function, code flow is temporarily re-routed into a wrapper function. After performing their requisite task, wrapper functions are meant to point to eventually point to the original (intended code flow) functions. Thus, FIG. 6A shows that the last lines of function2_wrapper and function3_wrapper makes direct calls to function2 and function3 respectively. Direct calls 610C, 620C are shown in FIG. 6A using dotted lines. Further, in some embodiments, a source transformation can include inserting a token comparison function for performing CFI token comparisons. The token comparison function (named token_compare in FIG. 6A) is called by function2_wrapper and function3_wrapper. If the outcome of the token comparison by token_compare is successful, function3 and function3 are called.

FIG. 6B shows assembly source code overlaid on the visual illustration of FIG. 6A. For example, FIG. 6B shows assembly source (shown in dotted blocks) corresponding to fn_table, function1, function2, and function2_wrapper. One patentable benefit of the disclosed DVA tool is generating visualizations to display changes to the source code in a simplified form (e.g., as shown in FIG. 6A) or in a detailed form (e.g., FIG. 6B) with assembly source code. Thus, the flexibility of the DVA tool can be appreciated in accommodating the interests of a skilled practitioner or a person with limited knowledge of assembly code. It will also be appreciated that FIGS. 5A, 5B, 6A, 6B correspond to visualizations of un-compiled code.

Figure 7:
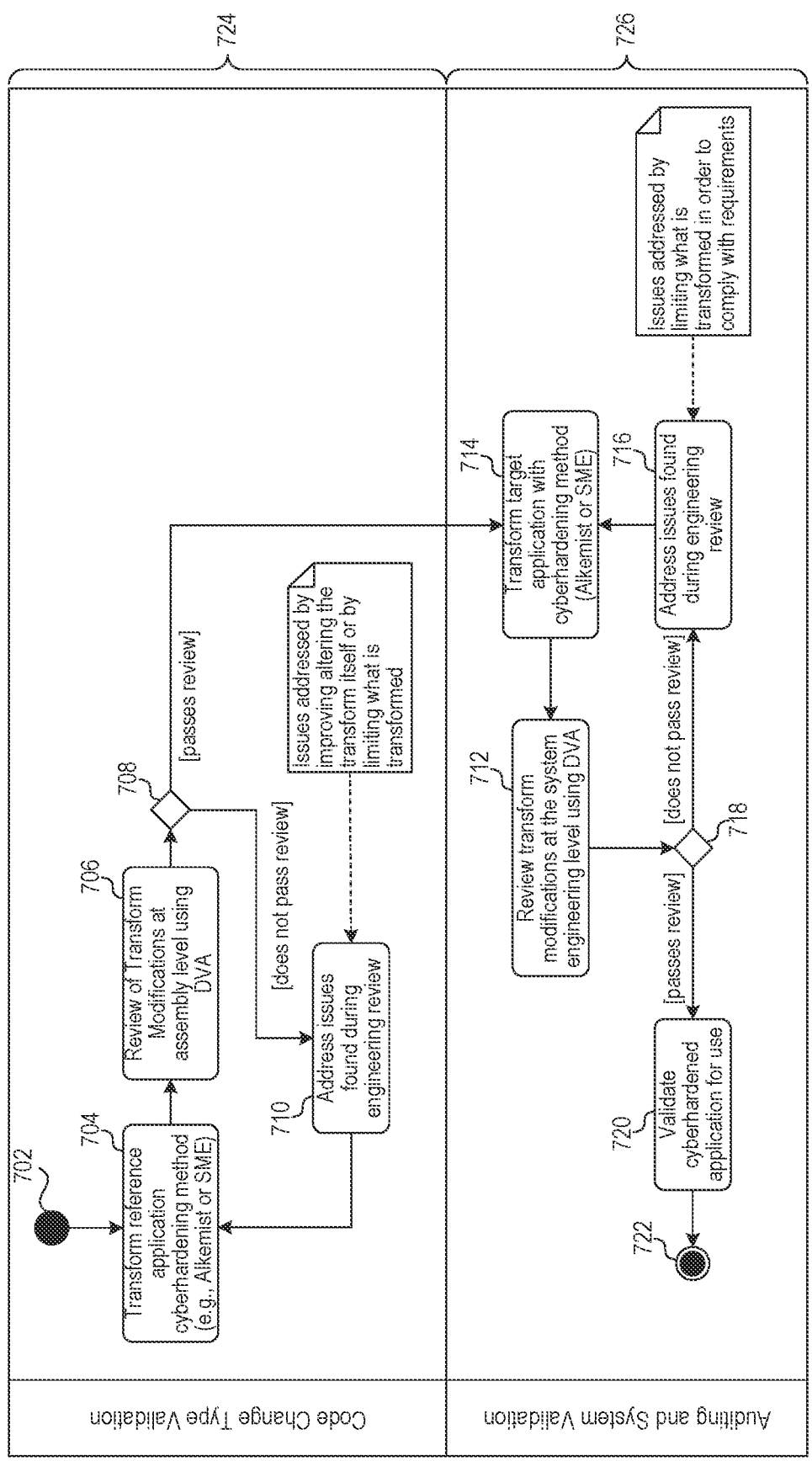
FIG. 7 is a workflow diagram showing steps of a process by the disclosed DVA tool.

FIG. 7 is a workflow diagram showing steps of a process by the disclosed DVA tool to validate a software application. The steps in this process are grouped broadly into two categories (e.g., corresponding to general skill levels of engineers such as assembly level engineer and systems level engineer), as shown in region 724 and 726. Region 724 represents activities associated with validating the types of code changes made by the transform. Code changes are different ways that a transform is able to modify the program binary such as by, modifying call sites or changing size of a stack frame accessible to the program binary. Region 726 represents activities associated with auditing and validating the transformed application at the system level. The overall process begins at node 702. At step 704, the assembly code changes to the software application are received (e.g., from a binary transformation tool such as ALKEMIST from RUNSAFE SECURITY or a source modification engine tool). At node 706, an engineer/user examines the assembly code changes using the DVA tool. Examples of an interface displaying assembly code changes are discussed in connection with FIGS. 6A and 6B. At decision node 708, the assembly code changes either passes or does not pass the examination by the engineer/user. Accordingly, at node 710, assembly source differences are rejected by the engineering team. For example, the engineering team can suggest modifications to the transform, or the team can suggest editing the transform (e.g., source transform or binary transform) to limit what the transform modifies. For example, a definition of a source transformation or a binary transformation can describe limits of what a respective transformation can modify.

If the assembly code changes passes the review, the software application is subjected to a transform (e.g., by a binary transformation tool such as ALKEMIST from RUNSAFE SECURITY or a source modification engine tool). At node 712, system-level engineering review confirms that the changes made throughout the codebase are appropriate and do not result in requirement non-compliance. The disclosed DVA tool can be used for conducting this review. At decision node 718, the review passes or not. At node 716, issues during the review are addressed. For example, reducing the impact of the transform on the software application. The newly cyberhardened software application passes review and is validated for use at node 720. The process ends at node 722.

Figure 8:
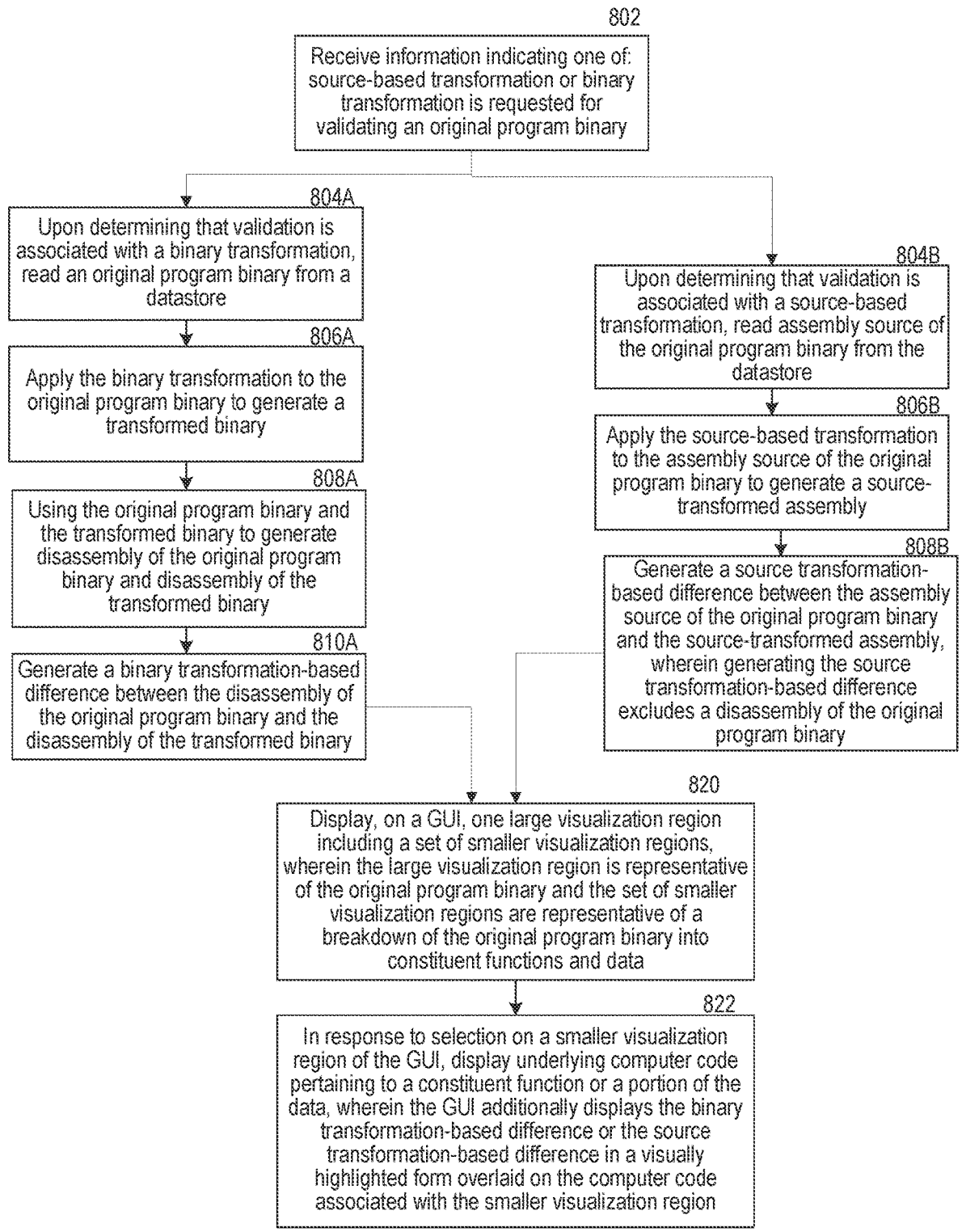
FIG. 8 is an example flowchart illustrating steps of a process by the disclosed DVA tool.

FIG. 8 is an example flowchart illustrating steps of a process by the disclosed DVA tool. At step 802, the process receives information indicating which one of source-based transformation or binary transformation is requested for validating an original program binary. If the process determines that binary transformation is requested, the process performs steps 804A, 806A, 808A, 810A. If the process determines that source transformation is requested, the process performs steps 804B, 806B, 808B.

At step 804A, the process (upon determining that validation is associated with a binary transformation) reads an original program binary from a datastore. At step 806A, the process applies the binary transformation to the original program binary to generate a transformed binary. At step 808A, the process generates disassembly of the original program binary and disassembly of the transformed binary using the original program binary and the transformed binary. At step 810A, the process generates a binary transformation-based difference between the disassembly of the original program binary and the disassembly of the transformed binary. After step 810A, the process moves to step 820.

At step 804B, the process (upon determining that validation is associated with a source-based transformation) reads assembly source of the original program binary from the datastore. At step 806B, the process applies the source-based transformation to assembly source of the original program binary to generate a source-transformed assembly. At step 808B, the process generates a source transformation-based difference between the assembly source of the original program binary and the source-transformed assembly, wherein generating the source transformation-based difference excludes a disassembly of the original program binary. After step 808B, the process moves to step 820.

At step 820, the process displays, on a GUI, one large visualization region including a set of smaller visualization regions, wherein the large visualization region is representative of the original program binary and the set of smaller visualization regions are representative of a breakdown of the original program binary into constituent functions and data. In response to selection (at step 822) on a smaller visualization region of the GUI, the process displays underlying computer code pertaining to a constituent function or a portion of the data, wherein the GUI additionally displays the binary transformation-based difference or the source transformation-based difference in a visually highlighted form overlaid on the computer code associated with the smaller visualization region. The selection in step 822 can be user-driven or fully automated. In some embodiments, the visually highlighted form includes information indicating at least one of: (i) insertion of a CFI token into the original program binary after a function call and at a beginning of a function, (ii) insertion of a call CFI check, (iii) insertion of a return CFI check, (iv) insertion of a token comparison function, (v) insertion of a wrapper function for indirect call checks, (vi) insertion of a wrapper function for register call checks, (vii) insertion of code to jump over return CFI code in a function that returns abnormally, or (viii) change of an original size of a stack frame accessible to the original program binary.

FIG. 9A illustrates an example snippet of source code written in C (a high-level architecture-independent language).

FIG. 9B illustrates an example of compiler output. As a result of compilation (e.g., using GCC compiler) source code is transformed from a high-level language to a low-level, architecture-specific language such as x86 assembly language associated with INTEL® i386 family CPUs. The compiler output in FIG. 9B is in human readable format.

To execute the code, an assembler program takes assembly language as input and generates machine language that the CPU can execute. Machine language is not encoded in ASCII and is not human readable.

FIG. 9C illustrates an example output showing disassembly of assembly language code. The example output in FIG. 9C are machine-language codes. On the left are hexadecimal values of machine-language operation codes, and on the right are mnemonics corresponding to the machine-language operation codes. Thus, it will be appreciated that a disassembly of assembly language code results in display of machine-language operation codes as human-readable mnemonics.

Some embodiments disclosed herein are now presented in clause-based format.

1. A method of visually displaying on a graphical user interface (GUI) of a computer changes made to an original program binary for cyberhardening, comprising:
receiving information indicating whether source transformation or binary transformation is requested for validating the original program binary;
upon determining that validation is associated with a binary transformation, generating a binary transformation-based difference between disassembly of the original program binary and disassembly of a transformed binary;
upon determining that validation is associated with a source transformation, generating a source transformation-based difference between assembly source of the original program binary and a source-transformed assembly;
displaying, on a GUI, one large visualization region including a set of smaller visualization regions, wherein the large visualization region is representative of the original program binary and the set of smaller visualization regions are representative of a breakdown of the original program binary into constituent functions and data; and
in response to selection on a smaller visualization region of the GUI, displaying underlying computer code pertaining to a constituent function or a portion of the data, wherein the GUI additionally displays the binary transformation-based difference or the source transformation-based difference in a visually highlighted form overlaid on the computer code associated with the smaller visualization region.

2. The method of clause 1, wherein generating the binary transformation-based difference includes:
applying the binary transformation to the original program binary to generate the transformed binary; and
using the original program binary and the transformed binary to generate the disassembly of the original program binary and the disassembly of the transformed binary.

3. The method of clause 1, wherein generating the source transformation-based difference includes:
applying the source transformation to assembly source of the original program binary to generate a source-transformed assembly.

4. The method of clause 1, wherein generating the source transformation-based difference excludes a disassembly of the original program binary.

5. The method of clause 2, wherein generating the binary transformation-based difference includes:
reading the original program binary from a datastore.

6. The method of clause 3, wherein generating the source transformation-based difference includes:
reading the assembly source of the original program binary from a datastore.

7. The method of clause 5, wherein the binary transformation-based difference is written into the datastore for additional analysis.

8. The method of clause 6, wherein the source transformation-based difference is written into the datastore for additional analysis.

9. The method of clause 1, wherein the source transformation includes inserting a token in a function of the original program binary for performing call flow integrity (CFI) token comparisons.

10. The method of clause 1, further comprising:
defining the limits of the source transformation and the binary transformation.

11. The method of clause 1, wherein the binary transformation-based difference or the source transformation-based difference displayed in the visually highlighted form includes information indicating at least one of:
(i) insertion of a CFI token into the original program binary after a function call and at a beginning of a function,
(ii) insertion of a call CFI check,
(iii) insertion of a return CFI check,
(iv) insertion of a token comparison function,
(v) insertion of a wrapper function for indirect call checks,
(vi) insertion of a wrapper function for register call checks,
(vii) insertion of code to jump over return CFI code in a function that returns abnormally, or
(viii) change of an original size of a stack frame accessible to the original program binary.

12. A non-transitory computer-readable storage medium having stored thereon instructions for visually displaying, on a graphical user interface (GUI) of a computer, changes made to an original program binary for cyberhardening, wherein the instructions when executed by a processor of an electronic device cause the processor to:

receive information indicating whether source transformation or binary transformation is requested for validating the original program binary;

upon determining that validation is associated with a binary transformation, generate a binary transformation-based difference between disassembly of the original program binary and disassembly of a transformed binary;

upon determining that validation is associated with a source transformation, generate a source transformation-based difference between assembly source of the original program binary and a source-transformed assembly;

display, on a GUI, one large visualization region including a set of smaller visualization regions, wherein the large visualization region is representative of the original program binary and the set of smaller visualization regions are representative of a breakdown of the original program binary into constituent functions and data; and in response to selection on a smaller visualization region of the GUI, display underlying computer code pertaining to a constituent function or a portion of the data, wherein the GUI additionally displays the binary transformation-based difference or the source transformation-based difference in a visually highlighted form overlaid on the computer code associated with the smaller visualization region.

13. The non-transitory computer-readable storage medium of clause 12, wherein instructions to generate the binary transformation-based difference include instructions to:

apply the binary transformation to the original program binary to generate the transformed binary; and use the original program binary and the transformed binary to generate the disassembly of the original program binary and the disassembly of the transformed binary.

14. The non-transitory computer-readable storage medium of clause 12, wherein the instructions to generate the source transformation-based difference include instructions to:

apply the source transformation to assembly source of the original program binary to generate a source-transformed assembly.

15. The non-transitory computer-readable storage medium of clause 12, wherein the instructions to display the binary transformation-based difference or the source transformation-based difference in the visually highlighted form includes instructions to display information indicating at least one of:

(i) insertion of a CFI token into the original program binary after a function call and at a beginning of a function,
(ii) insertion of a call CFI check,
(iii) insertion of a return CFI check,
(iv) insertion of a token comparison function,
(v) insertion of a wrapper function for indirect call checks,
(vi) insertion of a wrapper function for register call checks,
(vii) insertion of code to jump over return CFI code in a function that returns abnormally, or
(viii) change of an original size of a stack frame accessible to the original program binary.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media may include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments may be implemented as devices or modules using hardware circuits, software, or combinations thereof. For example, a hardware circuit implementation may include discrete analog and/or digital components that are, for example, integrated as part of a printed circuit board. Alternatively, or additionally, the disclosed components or modules may be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method of visually displaying on a graphical user interface (GUI) of a computer changes made to an original program binary for cyberhardening the original program binary to pre-emptively protect the original program binary against future cyberattacks, comprising:

receiving information indicating whether a source transformation or a binary transformation is requested for validating the original program binary;

upon determining that validation is associated with the binary transformation, generating a binary transformation-based difference between disassembly of the original program binary and disassembly of a transformed binary;

upon determining that validation is associated with the source transformation, generating a source transformation-based difference between assembly source of the original program binary and a source-transformed assembly;

displaying, on the GUI, one large visualization region including a set of smaller visualization regions, wherein the large visualization region is representative of the original program binary and the set of smaller visualization regions are representative of a breakdown of the original program binary into constituent functions and data; and in response to selection on a smaller visualization region of the GUI, displaying underlying computer code pertaining to a constituent function or a portion of the data, wherein the GUI additionally displays the binary transformation-based difference or the source transformation-based difference in a visually highlighted form overlaid on the computer code associated with the smaller visualization region.

2. The method of claim 1, wherein generating the binary transformation-based difference includes:

applying the binary transformation to the original program binary to generate the transformed binary; and
using the original program binary and the transformed binary to generate the disassembly of the original program binary and the disassembly of the transformed binary.

3. The method of claim 1, wherein generating the source transformation-based difference includes:

applying the source transformation to the assembly source of the original program binary to generate the source-transformed assembly.

4. The method of claim 1, wherein generating the source transformation-based difference excludes a disassembly of the original program binary.

5. The method of claim 2, wherein generating the binary transformation-based difference includes:

reading the original program binary from a datastore.

6. The method of claim 3, wherein generating the source transformation-based difference includes:

reading the assembly source of the original program binary from a datastore.

7. The method of claim 5, wherein the binary transformation-based difference is written into the datastore for additional analysis.

8. The method of claim 6, wherein the source transformation-based difference is written into the datastore for additional analysis.

9. The method of claim 1, wherein the source transformation includes inserting a token in a function of the original program binary for performing call flow integrity (CFI) token comparisons.

10. The method of claim 1, further comprising:

defining the limits of the source transformation and the binary transformation.

11. The method of claim 1, wherein the binary transformation-based difference or the source transformation-based difference displayed in the visually highlighted form includes information indicating at least one of:

(i) insertion of a CFI token into the original program binary after a function call and at a beginning of a function,
(ii) insertion of a call CFI check,
(iii) insertion of a return CFI check,
(iv) insertion of a token comparison function,
(v) insertion of a wrapper function for indirect call checks,
(vi) insertion of a wrapper function for register call checks,
(vii) insertion of code to jump over return CFI code in a function that returns abnormally, or
(viii) change of an original size of a stack frame accessible to the original program binary.

12. Non-transitory computer-readable storage medium having stored thereon instructions for visually displaying, on a graphical user interface (GUI) of a computer, changes made to an original program binary for cyberhardening the original program binary to pre-emptively protect the original program binary against future cyberattacks, wherein the instructions when executed by a processor of an electronic device cause the processor to:

receive information indicating whether a source transformation or a binary transformation is requested for validating the original program binary;
upon determining that validation is associated with the binary transformation, generate a binary transformation-based difference between disassembly of the original program binary and disassembly of a transformed binary;
upon determining that validation is associated with the source transformation, generate a source transformation-based difference between assembly source of the original program binary and a source-transformed assembly;
display, on the GUI, one large visualization region including a set of smaller visualization regions, wherein the large visualization region is representative of the original program binary and the set of smaller visualization regions are representative of a breakdown of the original program binary into constituent functions and data; and
in response to selection on a smaller visualization region of the GUI, display underlying computer code pertaining to a constituent function or a portion of the data, wherein the GUI additionally displays the binary transformation-based difference or the source transformation-based difference in a visually highlighted form overlaid on the computer code associated with the smaller visualization region.

13. The non-transitory computer-readable storage medium of claim 12, wherein instructions to generate the binary transformation-based difference include instructions to:

apply the binary transformation to the original program binary to generate the transformed binary; and
use the original program binary and the transformed binary to generate the disassembly of the original program binary and the disassembly of the transformed binary.

14. The non-transitory computer-readable storage medium of claim 12, wherein the instructions to generate the source transformation-based difference include instructions to:

apply the source transformation to the assembly source of the original program binary to generate the source-transformed assembly.

15. The non-transitory computer-readable storage medium of claim 12, wherein the instructions to display the binary transformation-based difference or the source transformation-based difference in the visually highlighted form includes instructions to display information indicating at least one of:

(i) insertion of a CFI token into the original program binary after a function call and at a beginning of a function,
(ii) insertion of a call CFI check, (iii) insertion of a return CFI check,
(iv) insertion of a token comparison function,
(v) insertion of a wrapper function for indirect call checks,
(vi) insertion of a wrapper function for register call checks,
(vii) insertion of code to jump over return CFI code in a function that returns abnormally, or
(viii) change of an original size of a stack frame accessible to the original program binary.

\* \* \* \* \*